United States Patent [19]

Bouchard et al.

[11] Patent Number: 4,527,089
[45] Date of Patent: Jul. 2, 1985

[54] COMPACT FLUORESCENT LAMP

[75] Inventors: Andre C. Bouchard, Peabody; Jakob Maya, Brookline, both of Mass.

[73] Assignee: GTE Products Corporation, Stamford, Conn.

[21] Appl. No.: 481,230

[22] Filed: Apr. 1, 1983

[51] Int. Cl.³ .................... H01J 61/30; H01J 61/35
[52] U.S. Cl. .................................... 313/493; 313/634
[58] Field of Search ............... 313/493, 634, 609, 610, 313/611, 612, 635

[56] References Cited

U.S. PATENT DOCUMENTS 3,501,662 3/1970 Plagge ................................ 313/493
4,208,618 6/1980 Heine .............................. 313/493 X

FOREIGN PATENT DOCUMENTS 57-61253 4/1982 Japan ................................... 313/634

Primary Examiner—David K. Moore
Assistant Examiner—K. Wieder
Attorney, Agent, or Firm—William H. McNeill; Carlo S. Bessone

[57] ABSTRACT

A compact fluorescent lamp comprises multiple, individual tubes mechanically formed into an assembly and inserted into an outer envelope. Only the outer envelope is hermetically sealed and includes an atmosphere of mercury and argon. Novel arc directing means connect the tubes to form a continuous arc path.

9 Claims, 3 Drawing Figures

COMPACT FLUORESCENT LAMP

TECHNICAL FIELD

This invention relates to fluorescent lamps and more particularly to compact versions of such lamps having utility as replacements for incandescent lamps.

BACKGROUND ART

The fluorescent lamp is the most widely utilized light source in the world for general illumination, primarily because of its relatively low initial cost and its efficacy: i.e., its light output relative to its power input, usually expressed as lumens per watt (LPW). Nevertheless, for home use, the fluorescent lamp has not taken precedence over the incandescent lamp. Many reasons have been advanced for this lack of acceptance, among them the poor color rendition of some fluorescent lamps and their need for a ballast. However, one of the major disadvantages lies in the fact that a fluorescent lamp is a linear light source whereas an incandescent lamp can almost be considered a point source. The typical fluorescent lamp has a length of from 18″ to 8′ and is somewhat cumbersome to work with.

With the increasing cost of energy, attempts have been made to overcome the latter difficulty. One of these attempts has utilized a plurality of fluorescent tubes having one or more smaller tubes connecting the ends of the fluorescent tubes to provide an arc path. Such lamps are shown in U.S. Pat. No. 3,501,662. Large, "U" shaped lamps such as those shown in U.S. Pat. Nos. 3,602,755; and 2,401,228; and triple bend lamps such as shown in U.S. Pat. No. 4,347,460 exemplify other attempts.

Still other attempts are shown in U.S. Pat. Nos. 4,208,618; 4,191,907; and Ser. No. 431,955, filed Sept. 30, 1982 and assigned to the assignee of the instant invention.

While each of these proposals has its own advantages, disadvantages also exist. The previous forms of multiple tubing lamps are expensive to produce and difficult to handle during manufacture.

Many types require expensive, custom made partitions and/or require large numbers of hermetic seals. Multiple bend tubes require large outlays for manufacturing equipment which adds to the cost of the final lamp.

DISCLOSURE OF THE INVENTION

It is, therefore, an object of the invention to obviate the disadvantages of the prior art.

It is another object of the invention to provide a compact fluorescent lamp.

Yet another object of the invention is the provision of a compact fluorescent lamp that is economical to fabricate.

These objects are accomplished, in one aspect of the invention, by a fluorescent lamp comprising a hermetically sealed outer envelope containing an arc generating and sustaining medium. Positioned within this outer envelope is an assembly comprised of a plurality of elongated glass tubes coated on their interior surface with a phosphor. All of the interior surfaces are open to the medium. The tubes have first and second ends and the assembly has first and second arc directing means operatively associated with the first and second ends of the tubes to provide a continuous arc path therethrough. An electrode is positioned at both ends of the arc path and means are provided for making electrical connection to the electrodes.

In an alternate embodiment, the assembly comprises a pair of U shaped tubes each having an electroded end and an open end. An arc directing means is operatively associated with the ends of the tubes and includes an arc director which connects the open end of the tubes.

Compact fluorescent lamps built according to the above provide many improvements over the prior art. Custom-made partition structures are avoided as are multiple hermetic seals. Also, since either straight tubing or simple U shaped tubes are employed, complex machinery for making multiple bends is also obviated and lamps made in accordance with this invention are economical to fabricate.

BEST MODE FOR CARRYING OUT THE INVENTION

For a better understanding of the present invention, together with other and further objects, advantages and capabilities thereof, reference is made to the following disclosure and appended claims taken in conjunction with the above-described drawings.

Figure 1:
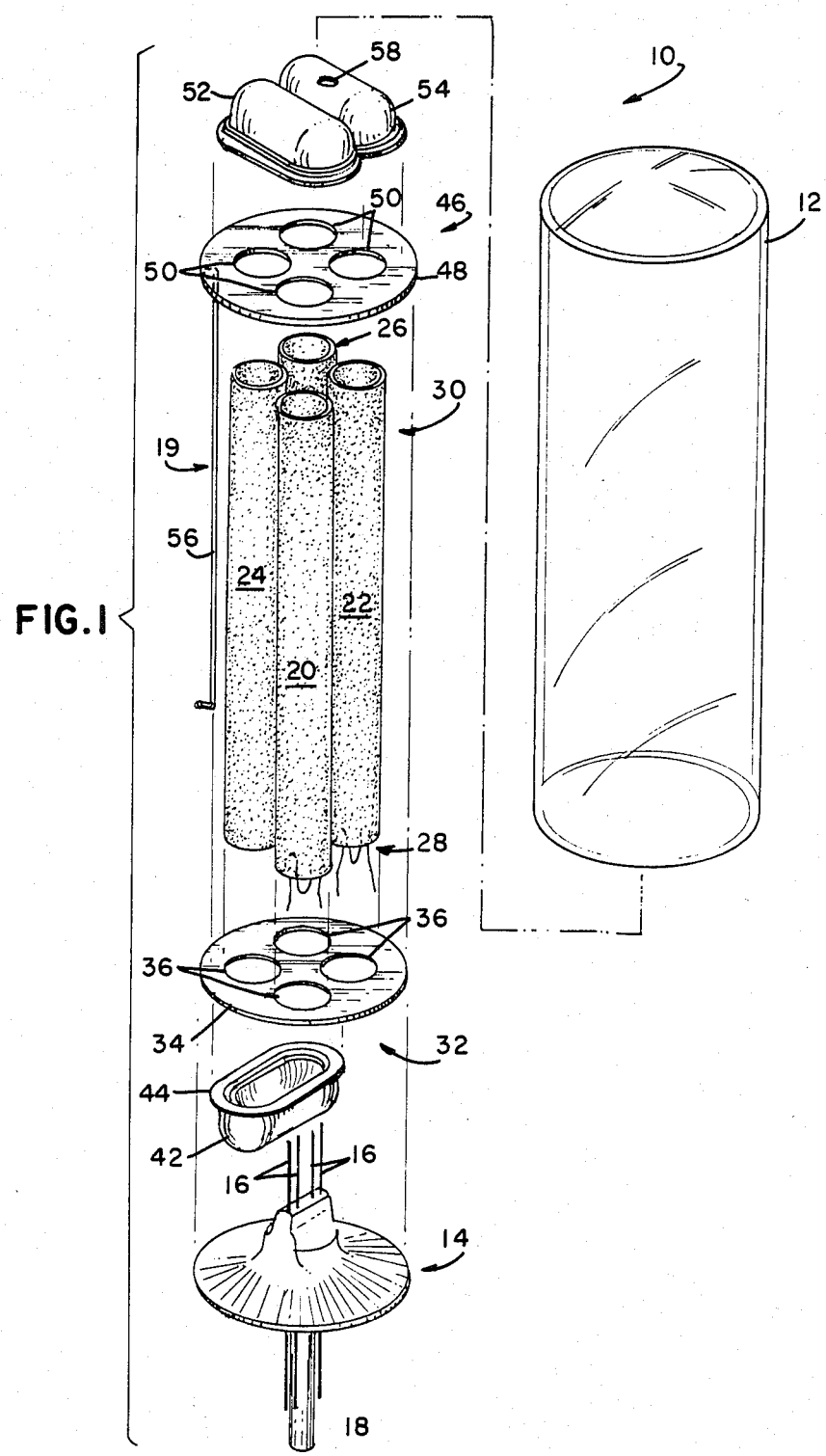
FIG. 1 is an exploded, perspective view of an embodiment of the invention.

Referring now to the drawings with greater particularity, there is shown in FIG. 1 a compact fluorescent lamp 10 having an outer, light-transmissive, glass envelope 12 which is hermetically sealed to a flare 14 which includes lead-in wires 16 and an exhaust tubulation 18. An arc generating and sustaining medium, e.g., about 20 mg of mercury and argon at a pressure of 3 torr, is provided within envelope 12.

Also, positioned within envelope 12 is an assembly 19 comprised of a plurality of elongated tubes 20, 22, 24 and 26 each having first ends 28 and second ends 30. The tubes are coated on their interior surface with a suitable U.V. excitable phosphor, e.g., a calcium halophosphate activated by antimony and manganese, or any operative phosphor or combination of phosphors. The phosphor can be applied by any suitable method, including those used to coat conventional fluorescent tubes.

In a preferred embodiment, the tubes 20, 22, 24 and 26 are formed from T5 tubing and are four inches (approx. 10.16 cm) long. For ease in coating, a single, long tube, say three feet long, can be coated and subsequently cut into appropriate lengths. The cut ends of the tubing should be lightly fire polished.

A first arc directing means 32 is associated with first ends 28 of tubes 20, 22, 24 and 26, and comprises a first base member 34 having apertures 36 therein for receiving the first ends 28 of the tubes.

Figure 2:
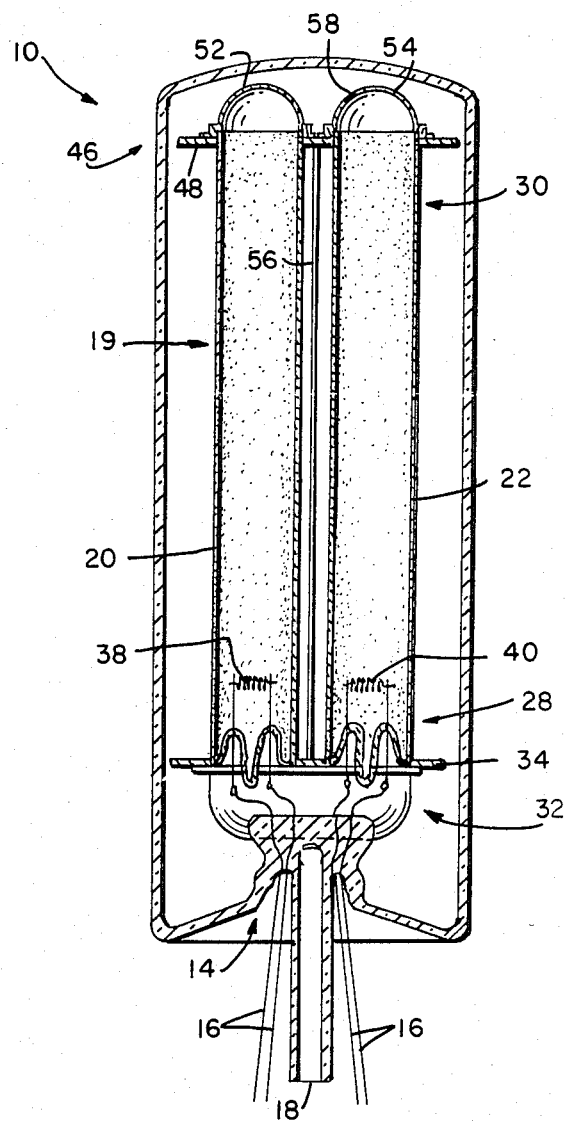
FIG. 2 is a sectional, elevational view of the embodiment of FIG. 1.

Two of the tubes, e.g., 20 and 22, have their first ends 28 provided with electrodes 38 and 40, respectively (see FIG. 2). While these electrodes may be sealed into the tube ends in a conventional manner for convenience in handling, it is not necessary that a hermetic seal be formed, and the electrodes may be mounted within the tubes in any desired manner.

A single arc director 42 is positioned on the underside of first base member 34 and covers the apertures into which the first ends 28 of tubes 24 and 26 are fitted. As shown, arc director 42 is in the form of a rectangular dish having a peripheral rim 44 about its open side. The arc director 42 is affixed to the underside by any suitable means, if it is formed separate from first base member 34, although the entire arc directing means 34 can be formed as a one piece unit.

A second art directing means 46 is associated with the second ends 30 of tubes 20, 22, 24 and 26 and comprises a second base member 48 having apertures 50 therein for receiving the second ends 30 of the tubes.

The upper side of second base member 48, i.e., the side remote from the tubes, has two arc directors 52 and 54 positioned thereon. The arc directors 52 and 54 can be of the same construction as arc director 42. Arc director 52 encompasses the apertures receiving the second ends 30 of the tubes 20 and 24; and arc director 54 encompasses the apertures receiving the second ends 30 of the tubes 22 and 26.

A connecting rod 56 extends between the first base member 34 and the second base member 48 and is affixed thereto, thus securing the assembly 19 together as a unit.

The fit between the various ends of the tubes within the apertures of the base members is merely a mechanical one that is characterized as being arc tight but permeable to the arc generating and sustaining medium that is present within the hermetically sealed outer envelope 12. To aid in evacuating and to insure that the medium penetrates within the tubes, at least one of the arc directors, e.g., 54, is provided with an opening 58 therein.

In operation, the arc will proceed, during each half cycle, from electrode 38 up the length of tube 20, across arc director 52, down tube 24, across arc director 42, up tube 26, across arc director 54, and down tube 22 to electrode. On the following half cycle, of course, the direction will be reversed.

Lamps constructed as described above have many advantages over those of the prior art. Simple, mechanical joints are employed together with novel arc directors, to form a long arc path in a compact lamp. The lamps can be constructed with a range of tube quantities and tube lengths giving flexibility to the size and output of the lamps.

The lamps can be operated at high electrical loadings because the first arc directing means provide a heat shielding effect, thus allowing the mercury vapor pressure to be held at a lower temperature at the bottom of envelope 12.

The tubes can be constructed from a variety of materials since no seals are required internably.

Because each of the tubes is a separate entity, each of the tubes can have a different phosphor applied thereto, thus allowing for color blending.

Further, the lamps are adaptable to high speed manufacturing techniques because of the mechanical nature of the inner assembly.

Figure 3:
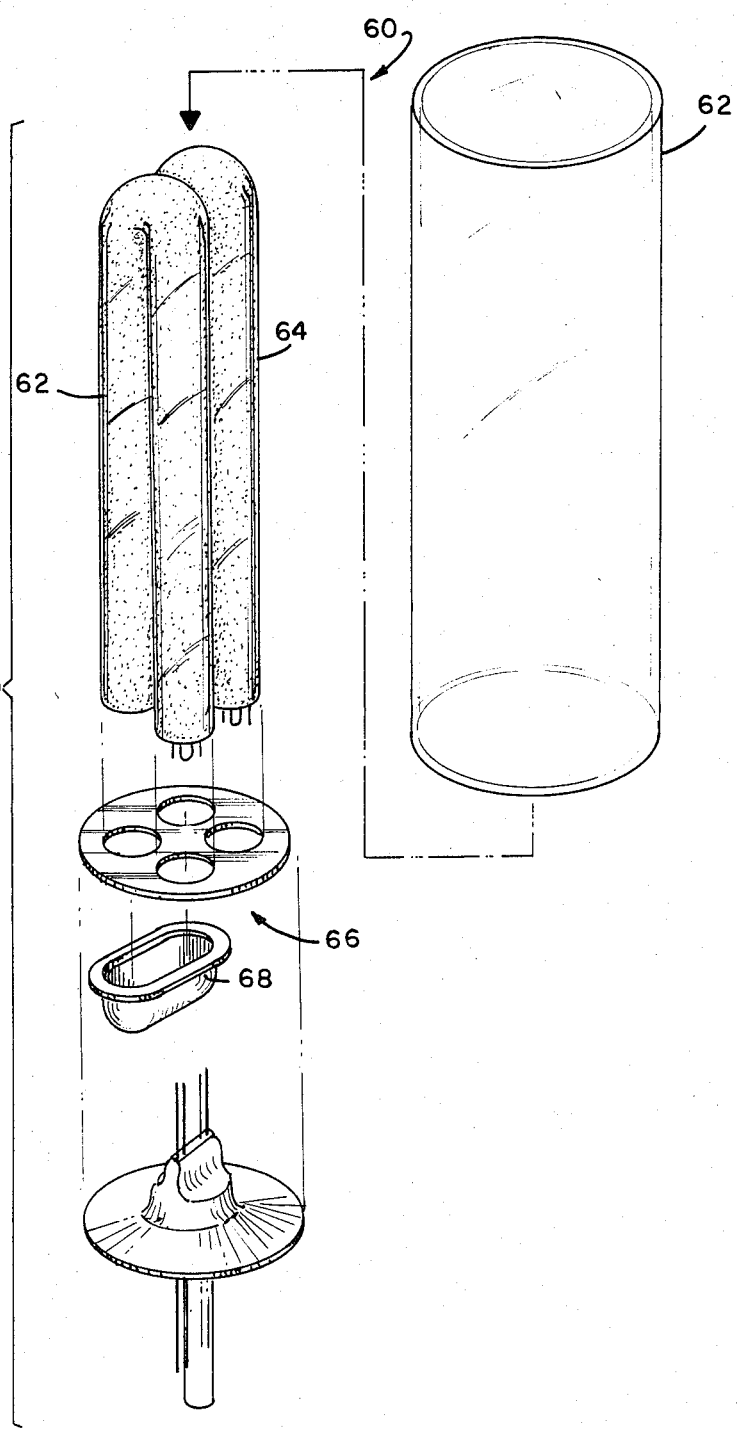
FIG. 3 is an exploded, perspective view of an alternate embodiment.

An alternate construction is shown in FIG. 3 wherein lamp 60 is substantially similar to lamp 10 except that two U shaped tubes 62, 64 are employed. In the latter embodiment, only one arc directing means 66 is necessary. Arc directing means 66 can be constructed similar to arc directing means 32. Lamp 60 has the additional advantage of providing light from the U bends. Electrodes are provided in adjacent ends of the U tubes and the arc director 68 connects the open, or un-electroded, ends.

There is thus provided a novel, compact fluorescent lamp having the advantages enumerated above, over the prior art.

The arc directing means can be formed from machineable, sintered, boron nitride and rod 56 can be threaded at its ends.

Alternatively, the arc directing means can be a suitable metal such as aluminum and can be covered with a glass frit such as described and claimed in Ser. No. 481,203 filed concurrently herewith; or they can be left uncoated and rod 56 can be welded thereto, such as described and claimed in Ser. No. 481,204, also filed concurrently herewith.

While there has been shown what are at present considered to be the preferred embodiments of the invention, it will be apparent to those skilled in the art that various changes and modifications can be made herein without departing from the scope of the invention as defined by the appended claims.

We claim:

1. A fluorescent lamp comprising: a hermetically sealed outer envelope containing an arc generating and sustaining medium; an assembly positioned within said envelope, said assembly comprising a plurality of elongated glass tubes each having first and second ends, said tubes being coated on their interior surface with a phosphor, all of said interior surfaces being open to said medium; first and second arc directing means operatively associated with said first and second ends of said tubes to provide a continuous arc path through said tubes; an electrode at either end of said arc path; and means for making electrical connection to said electrodes.

2. The fluorescent lamp of claim 1 wherein said assembly includes four tubes.

3. The fluorescent lamp of claim 2 wherein said electrodes are adjacent to, and electrically isolated from, one another.

4. The fluorescent lamp of claim 3 wherein said first arc directing means comprises a first base member having four apertures therein for receiving the first ends of said tubes, and a single arc director affixed to said first base member on the side opposite said tubes.

5. The fluorescent lamp of claim 4 wherein said second arc directing means comprises a second base member having four apertures therein for receiving the second ends of said tubes, and a pair of arc directors affixed to said second base member on the side opposite said tubes.

6. The fluorescent lamp of claim 5 wherein a connecting rod extends between said first base member and said second base member adjacent said tubes and substantially parallel thereto, and is affixed to said base members.

7. A fluorescent lamp comprising: a hermetically sealed outer envelope containing an arc generating and sustaining medium; an assembly positioned within said envelope, said assembly comprising a pair of U shaped tubes coated on their interior surface with a phosphor, each of said tubes having an electrode end carrying an electrode and an open end; and an arc tube directing means operatively associated with said ends of said tubes, said arc directing means comprising a base member mounting said tubes in receptors which are arc-tight and medium permeable and further including an arc director connecting said open ends of said tubes.

8. The fluorescent lamp of claim 7 wherein said arc director has the configuration of a rectangular dish and is positioned on the side of said base member opposite said tubes.

9. The fluorescent lamp of claim 6 wherein said second arc director is provided with an aperture in a wall thereof.

* * * * *